United States Patent
Seppälä et al.

(10) Patent No.: US 7,120,131 B2
(45) Date of Patent: Oct. 10, 2006

(54) SELECTION OF SERVING NETWORK ELEMENT IN TELECOMMUNICATIONS NETWORK

(75) Inventors: Jukka Seppälä, Vesilahti (FI); Henry Haverinen, Tampere (FI); Martin Bergenwall, Espoo (FI); Tom Söderlund, Helsinki (FI); Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 983 days.

(21) Appl. No.: 09/963,332

(22) Filed: Sep. 24, 2001

(65) Prior Publication Data

US 2002/0039367 A1  Apr. 4, 2002

(30) Foreign Application Priority Data

Sep. 29, 2000 (FI) .................................. 20002160

(51) Int. Cl.
*H04B 7/00* (2006.01)
(52) U.S. Cl. ..................................................... 370/310
(58) Field of Classification Search ............... 370/310, 370/328, 389, 392, 395.52; 455/403, 422, 455/432–435, 461
See application file for complete search history.

(56) References Cited

U.S. PATENT DOCUMENTS

| | | | | |
|---|---|---|---|---|
| 5,815,811 A | | 9/1998 | Pinard et al. ............... | 455/434 |
| 6,021,182 A | | 2/2000 | Toyosawa et al. ....... | 379/90.01 |
| 6,366,561 B1 | * | 4/2002 | Bender ....................... | 370/238 |
| 6,400,722 B1 | * | 6/2002 | Chuah et al. ............... | 370/401 |
| 6,421,714 B1 | * | 7/2002 | Rai et al. ..................... | 709/217 |
| 6,522,881 B1 | * | 2/2003 | Feder et al. ................ | 455/437 |

FOREIGN PATENT DOCUMENTS

| | | |
|---|---|---|
| EP | 0 910 198 A2 | 4/1999 |
| EP | 1133208 A2 | 9/2001 |
| WO | WO 00/54475 | 9/2000 |

OTHER PUBLICATIONS

European search report on EP 01 66 0161.*
"Hierarchical MIPv6 mobility management", Hesham Soliman et al., Sep. 13, 2000, pp. 1-16, Retrieved form the Internet: <URL:http://community.roxen.com/developers/idocs/drafts/draft-soliman-mobileip-hmipv_6-01.txt>retrieved on Jul. 24, 2003.
"Fast Handoffs in Mobile Ipv4", Karim El Malki et al., Sep. 27, 2000, pp. 1-15, Retrieved from the Internet: <URL:http://community.roxen.com/developers/idocs/drafts/draft-elmalki-handoffs-03.txt>retrieved on Jul. 24, 2003.
"RFC 2002: IP Mobility Support", Perkins C., Oct. 1996, Retrieved from the Internet: <URL:http://axpl.csie.ncu.edu.tw/ctseng/mobile98-2/rfc2002.html>retrieved on Nov. 25, 1999.
"Mobile IP", Perkins C E, May 1, 1997, vol. 35, No. 5, pp. 84-86, 91-99.
RFC 2002, "Standards Track; IP Mobility Support", IBM, 1996.
"Mobility Support In IPv6", internet draft, IETF, Apr. 27, 2000.

* cited by examiner

*Primary Examiner*—Dmitry Levitan
(74) *Attorney, Agent, or Firm*—Perman & Green, LLP

(57) ABSTRACT

A method of selecting the serving network element in a telecommunications network. Mobility agents or routers transmit attribute information on one or more network elements in advertising messages to at least one mobile node. This information is used in the mobile node for selecting the serving network element.

22 Claims, 3 Drawing Sheets

| Type | Length | Sequence number | | | | | | | |
|---|---|---|---|---|---|---|---|---|---|
| Registration lifetime | | | R | B | H | F | M | G | V | T | Res |
| Care-of addresses (0 or more) | | | | | | | | | | |
| Attributes | | | | | | | | | | |

SELECTION OF SERVING NETWORK ELEMENT IN TELECOMMUNICATIONS NETWORK

BACKGROUND OF THE INVENTION

The invention relates to selection of the serving network element in telecommunications systems, and particularly to advertising of mobile IP mobility agents or routers.

Mobility of employees has clearly increased during the past few years, and this trend is not expected to change. Attachment of a mobile node to the IP network involves, however, several problems. One solution to this problem is the mobile IP protocol defined by the mobile IP task force of the IETF (Internet Engineering Task Force). FIG. 1 illustrates a telecommunications system which supports the mobile IP protocol. The mobile IP refers to a mechanism for providing a mobile node user with telecommunications features using an IP address. It allows mobile nodes MN to change their Internet access point without changing their IP address. Thus the mobile IP facilitates traffic between the mobile node MN and a corresponding host CH, which communicates with the mobile node, through the home address of the mobile node MN.

In this application the term 'mobile node' MN refers to a host which wants to use the home network HN address when it is connected to a network other than the home network HN. This can be performed using e.g. telephone connections, ISDN connections, local network LAN connections (Local Area Network) or cellular connections, etc. The 'home network' HN may be a virtual IP network to which the user of the mobile node MN logically belongs. Its physical embodiment may be e.g. a local area network (LAN) which is connected to the Internet via a router. The 'home address' refers to an address assigned to the mobile node MN for rather a long period. It may remain unchanged regardless of where the mobile node MN connects to the Internet. A 'home agent' HA is a mobile IP mobility agent. The home agent is a routing entity which is located in the home network HN of the mobile node MN, transmits packets by tunnelling them for transmission to the mobile node MN when this is not in the home network HN, and maintains the current location information of the mobile node MN. Tunnelling means establishment of a virtual link, i.e. a tunnel TN, between nodes.

If the mobile node MN, when switched on or due to a transfer, notices that it is in a visited network VN, it can register with the home agent HA via another mobility agent, i.e. a foreign agent FA, and the mobile IP function can be activated. The foreign agent FA refers to a routing entity which is located in the visited network VN of the mobile node MN and offers routing services to the mobile node MN when it is registered, thus allowing the mobile node MN to use the address of its home network HN. The foreign agent FA transmits packets to the mobile node MN that have been tunnelled by its home agent HA. The foreign agent FA may also function as the default router of registered mobile nodes MN for the packets transmitted by the mobile node MN.

In the mobile IP protocol, a care-of address (COA) is defined as the end point of the tunnel for packets which are addressed to the mobile node MN in the visited network VN. The foreign agents FA may transmit advertising messages of mobile agents which include the COA to mobile nodes MN on their own initiative or at the request of the MN. One foreign agent can produce more than one COA in its advertising messages. The mobile node MN typically registers the COA received from the advertising message of the foreign agent FA in its home agent HA by sending a registration request. The home agent HA responds with a registration reply and maintains mobility binding for the mobile node MN. 'Mobility binding' means association of the home address with the COA, including the remaining lifetime of this association. The mobile node MN may have several COAs at the same time.

Depending on the IP network, a network may comprise several foreign agents which transmit advertising messages to mobile nodes MN. Thus the mobile node may receive advertising messages from several foreign agents. Furthermore, various foreign agents FA may have very different attributes, which may also vary dynamically according to the load situation, for example. The foreign agent and the COA to be used are typically selected by choosing the foreign agent FA that has sent the message received first, and thus selection of the foreign agent is by no means optimal.

BRIEF DESCRIPTION OF THE INVENTION

An object of the invention is to provide a totally new method of utilizing advertising messages transmitted by mobility agents or routers in telecommunications systems. The objects of the invention are achieved with methods, a router, a network element of a telecommunications system, a mobile node and an advertising message which are characterized by what is disclosed in the independent claims. The preferred embodiments of the invention are disclosed in the dependent claims.

The invention is based on transmitting information on the attributes of one or more network elements of the telecommunications system in advertising messages from mobility agents and/or routers to mobile nodes. An advertising message is a message which is typically broadcast in a sub-network and by means of which a network element informs other network devices of its existence. Thus the information the mobility agents or routers have or the information they have obtained from elsewhere can be transmitted to a mobile node, which can utilize the information when selecting the serving network element. In that case the network element to be used, such as the mobility agent, access point or router, can be selected optimally.

According to a preferred embodiment of the invention, the information on the attributes of network elements is included advertising messages, which contain care of addresses and are transmitted periodically by mobility agents and/or at the request of a mobile node. This preferred embodiment allows easy utilization of advertising messages that would be transmitted in any case, but the number of messages to be transmitted does not increase.

According to another preferred embodiment of the invention, the information to be transmitted includes information on the attributes of the foreign agent. On the basis of the information received from the foreign agents the mobile node can compare the attributes of different foreign agents. The mobile node may select as the serving foreign agent the foreign agent that according to its attributes can best take care of the communication needs of the mobile node. Furthermore, the mobile node may send a registration request to the selected foreign agent. This allows the mobile node to select the most suitable foreign agent from among several foreign agents on the basis of the selected criteria. Consequently, the load can also be balanced between different foreign agents.

According to a further preferred embodiment of the invention, the information transmitted by the router includes attribute information on the router. In that case the mobile node can select the router to be used optimally on the basis of the above-mentioned information. This is particularly advantageous in a system according to the Ipv6 protocol which supports the mobile IP and in which no foreign agents are needed to implement the mobile IP.

According to some other preferred embodiments of the invention, the telecommunications system is wireless and comprises access points which offer a wireless connection to at least one mobile node. The network element attributes transmitted to the mobile node comprise at least one of the following:

loads of different access points (based e.g. on the number of users)

information on the least loaded access points information on the recommended access point other quality of service parameters of the access points.

The mobile node can utilize this information and any other criteria available, such as radio channel measurements, and select as the serving network element the access point that can best offer a wireless connection. This way the resources of a wireless telecommunications system can be utilized more efficiently. This applies particularly to systems in which the mobile node makes a decision on handover only on the basis of radio signals measured by it.

BRIEF DESCRIPTION OF THE DRAWINGS

The invention will be described in greater detail by means of preferred embodiments with reference to the attached drawings, in which.

DETAILED DESCRIPTION OF THE INVENTION

Figure 1:
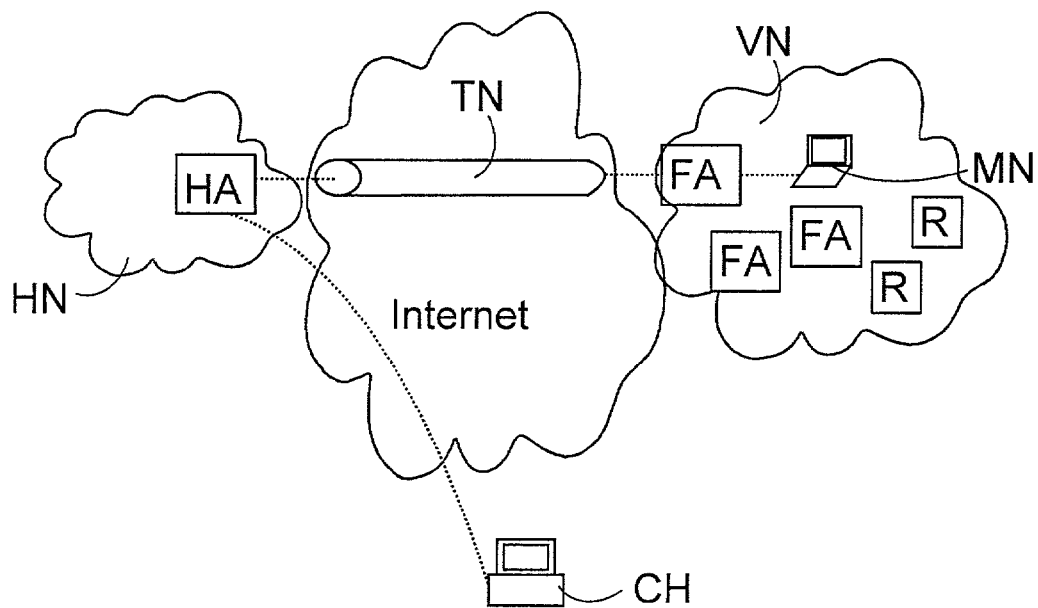
FIG. 1 illustrates a telecommunications system which can utilize the mobile IP.

The invention can be applied in any telecommunications system comprising network elements which send advertising messages, e.g. in the telecommunication system shown in FIG. 1.

Various techniques of establishing wireless or fixed connections can be used for establishing connections to a mobile node MN. A connection can be established utilizing e.g. telephone connections, ISDN connection, local area network (LAN) connections or cellular connections.

The mobile node MN may comprise a functionality for establishing a connection to a wireless local area network WLAN, for instance. It is possible to establish a fixed connection from the access points of the wireless local area network to other elements of the network (HN, VN) and further to the Internet. The MN can also be a mobile station which supports e.g. the second-generation GSM system and/or the third-generation UMTS system (Universal Mobile Telecommunication System). The visited network VN and the home network HN may be e.g. networks which comprise the GPRS packet radio service (General Packet Radio Service). In that case the HA and FA agents are preferably located in GGSN support nodes (GPRS Gateway Support Node). FIG. 1 also illustrates routers R.

Figure 2A:
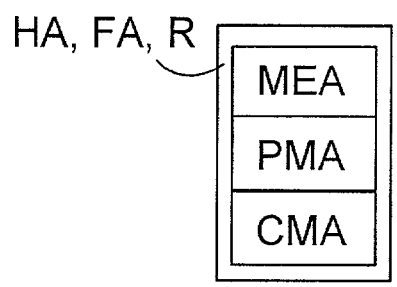
FIG. 2a illustrates a highly simplified structure of a network element which comprises a router or a mobility agent.
Figure 2B:
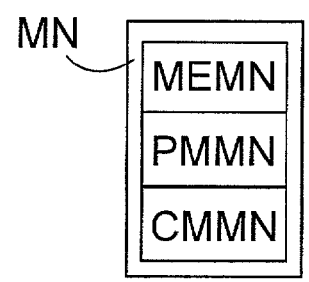
FIG. 2b illustrates a highly simplified structure of a mobile node.

According to a preferred embodiment, information on the attributes of the network elements of the system in question is transmitted from the mobility agents HA, FA. The functionality of the IP mobility agent according to the preferred embodiment can be implemented in any network element. It may be a separate node, integrated into the access point of a wireless network or included in a router or in a device which implements a virtual private network VPN. As shown in FIG. 2a, the network element that implements the mobility agent HA, FA comprises processing means PMA, data transmission means CMA and memory MEA for collecting information on the network element attributes and for sending the information to one or more mobile nodes MN in advertising messages. As illustrated in FIG. 2b, the mobile node MN comprises processing means PMMN, memory MEMN and data transmission means CMMN. Using the processing means PMMN, the mobile node MN can compare the information transmitted by the mobility agents and received by the data transmission means CMMN, and select the serving network element on the basis of the comparison. The processing means PMA, PMMN are preferably implemented as software which is run in a processor. The processing means PMA, PMMN can also be implemented as control logic or as a hardware solution, e.g. with ASIC circuits (Application Specific Integrated Circuit).

In the example system of FIG. 1 the foreign agents FA can transmit information on their attributes or on the attributes of other network elements of the visited network VN. The home agents HA can also transmit information on the network element attributes, preferably on the attributes of other network elements of the home network HN. In that case the mobility agents HA, FA can be utilized efficiently for transmitting various kind of information to the mobile node MN. In the visited network VN, in particular, information by means of which the MN can select the most suitable foreign agent, for example, can be transmitted to a visiting mobile node. The information on the system attributes is preferably included in advertising messages of the mobility agents which the mobility agents would transmit in any case.

According to a preferred embodiment, the attribute information comprises information on the attributes of the foreign agent FA that has sent the information. The following foreign agent attributes, for example, can be transmitted:

current delay of the connection offered by the foreign agent average delay of the connection offered by the foreign agent jitter of the connection offered by the foreign agent number of users served by the foreign agent throughput of the foreign agent and other possible quality of service parameters load of the foreign agent (per a load class if different quality of service classes are in use)

proportional load of the foreign agent compared to the other foreign agents of the system.

The foreign agent FA may support quality of service reservation meachanisms (e.g. Resource Reservation Protocol RSVP or Differentiated Services), in which case different quality of service classes can be examined separately. For example, information on the load of the foreign agent can be transmitted in view of the short-delay service class intended for real-time applications.

Some of the attributes may be invariable, in which case they may be stored in the memory of the network element that comprises a foreign agent FA (e.g. the maximum transmission capacity of the foreign agent). If information on the dynamic network element attributes is to be included, information is collected on the foreign agent FA attributes, i.e. on the current attributes of the network element that includes the foreign agent.

According to a preferred embodiment, the information transmitted by the mobility agents HA, FA comprises information on the attributes of other network elements. This information may consist of information on any attributes which the mobile node MN can utilize in the selection of the serving network element in the visited network VN or in the home network HN. In that case the mobility agent HA, FA typically collects information on the other network elements of the system. There is a data transmission connection between the mobility agent HA, FA and the network element concerned, and the network element is arranged to transmit its attribute information to the mobility agent either automatically or at the request of the mobility agent. Information can also be collected in a concentrated manner by a server which collects information on network elements and updates the information to be transmitted from the mobility agents e.g. by means of an SNMP protocol (Simple Network Management Protocol).

The attribute information on the other network elements may contain information e.g. on the attributes of the different access points of the network VN to allow the MN to select the most suitable access point. This is particularly advantageous in a wireless telecommunications system in which the MN makes the decision of handover from one access point to another. This embodiment will be described in greater detail in connection with FIG. 4.

Figure 3:
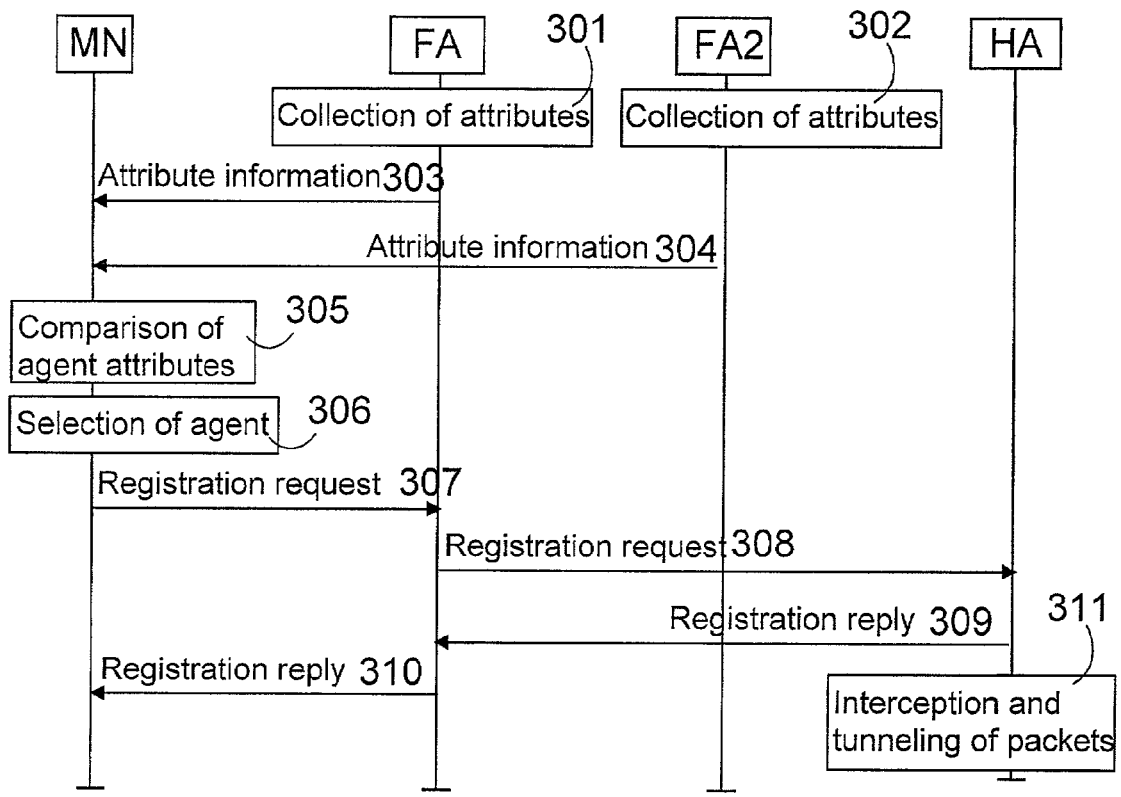
FIG. 3 illustrates selection of a foreign agent and establishment of mobility binding according to a preferred embodiment.

FIG. 3 illustrates selection of a foreign agent FA and registration with the home agent HA by means of the selected foreign agent FA. Foreign agents FA, FA2 collect 301, 302 (Collection of Attributes) information on their attributes. The FA and FA2 broadcast or multicast 303, 304 (Attribute information) the information preferably in advertising messages to mobile nodes MN which lack mobility binding. The mobile node MN monitors the messages transmitted on the link layer and receives information 303, 304 from different foreign agents FA, FA2.

The MN compares 305 (Comparison of agent attributes) the attributes of different foreign agents. The processing means PMMN of the MN comprise a QoS management entity, which compares different foreign agents on the basis of the attribute information received from them and the connection needed by the node. The QoS management entity is connected to the connection management entity of the application layer (e.g. H.323 or SIP protocol entity), in which case information is obtained on the connection quality, i.e. what kind of data the MN needs to communicate (real-time vs. non-real-time).

The mobile node MN selects 306 (Selection of Agent) the foreign agent FA that according to its attributes can best take care of data transmission of the mobile node. The agent can be selected e.g. on the basis of the port number according to the application used: in time-critical applications, such as the VoIP application, the delay may be the determining criterion, whereas in a data transmission application the transmission capacity and/or the load may be the determining criterion.

After the mobile node MN has selected the foreign agent FA to be used and knows the COA of the FA, it sends 307 a registration request to the IP address of the selected foreign agent FA. The registration request 307 comprises the home address of the mobile node MN, the address of the home agent HA and the care-of address obtained from the FA's advertising message. If the request is acceptable, the foreign agent FA updates the visitor list it maintains on the basis of the registration request sent by the mobile node MN. Then the FA forwards 308 the registration request to the home agent HA.

When the home agent HA receives the registration request, it processes the request and possibly accepts it. If the registration request is acceptable, the HA updates the COA list it maintains by adding mobility binding and its lifetime to the mobile node MN, i.e. associates the received care-of address with the home address of the mobile node MN. The HA preferably updates association configuration of the link layer, such as ARP configuration (Address Resolution Protocol), and tunnelling configuration, and uses them for intercepting and tunnelling the packets addressed to the mobile node MN. For example, proxy-ARP and gratuitous ARP techniques can be used.

If the registration request (308) is acceptable, the HA sends 309 a registration reply to the foreign agent FA. The foreign agent FA updates the visitor list it maintains and forwards 310 the registration reply to the mobile node MN. The registration reply contains codes necessary for informing the node MN of the status of the registration request and information on the registration lifetime granted by the home agent, which may be shorter than the registration lifetime that was originally requested.

After registration, the home agent HA can intercept the packets addressed to the mobile node MN and tunnel them 311 (Interception and tunnelling of packets), i.e. encapsulate the packets using an encapsulating algorithm in accordance with the care-of address and transmit them to the foreign agent FA. On receiving an encapsulated packet the foreign agent FA decapsulates it and finds out the original destination address. The packet is transmitted to the mobile node MN on the basis of the original destination address. Packets that have been directly tunnelled to the mobile node are decapsulated by the MN itself. The HA tunnels packets addressed to the mobile node MN until deregistration is performed.

Three authentication extensions are defined for the mobile IP protocol: a mobile node-home agent (mobile-home) authentication extension (compulsory), a mobile node-foreign agent (mobile-foreign) extension and a foreign agent-home agent (foreign-home) extension. These extensions can be used for encrypting data transmission between the visited network VN and the mobile node MN in the case of a wireless connection, in particular.

Figure 4:
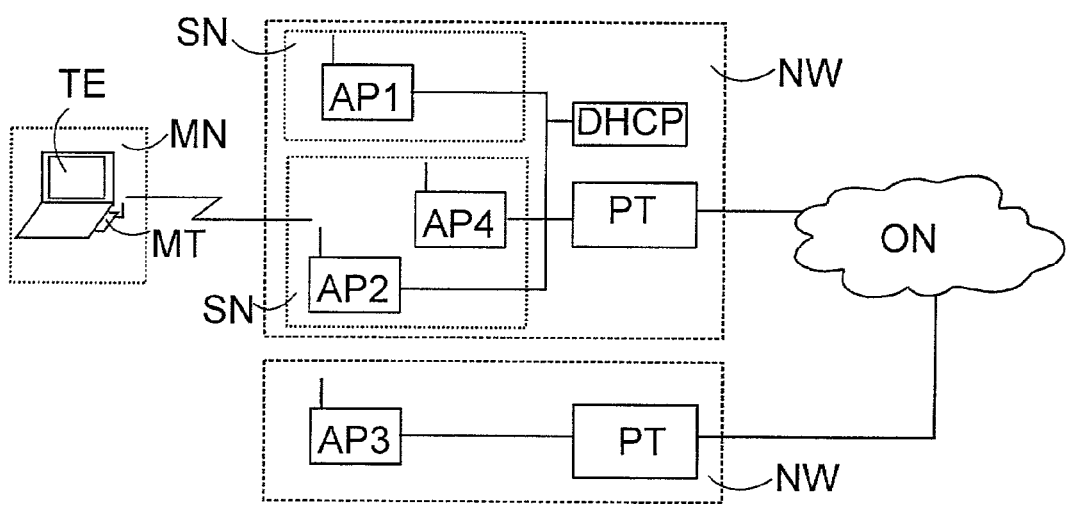
FIG. 4 illustrates a WLAN system.

FIG. 4 illustrates an example of a WLAN system based on the IEEE standard 802.11. The mobile node MN comprises a terminal TE (typically a laptop) and a WLAN adapter MT. The WLAN network NW comprises several WLAN access points AP1–4, which offer a wireless connection to several mobile nodes MN. The IEEE standard 802.11 defines the protocols of both the physical layer and the link layer (MAC) for data transmission over the radio interface. Infrared or two spread spectrum techniques (Direct Sequence Spread Spectrum DSSS, Frequency Hopped Spread Spectrum FHSS) can be used for data transmission. Both spread spectrum techniques employ a 2.4 gigahertz band. According to the IEEE standard 802.11, the CSMA/CA (Carrier Sense Multiple Access with Collision Avoidance) technique is employed on the MAC layer.

The mobile WLAN nodes MN may form an ad hoc network simply by establishing a connection to another mobile node. Infrastructure networks are formed by establishing connections between the access points AP1–4 and the mobile nodes MN. The access points AP1–4 provide network access for the mobile nodes MN and thus form an extended service set (ESS). The access points AP1–4 control at least allocation of transmission times and reception, buffering and transmission of data between the mobile node MN and the network NW. The access points AP1–4 may form sub-networks SN. The logical WLAN network NW may also comprise one or more sub-networks SN. Furthermore, the WLAN network may offer access to other networks ON, such as the Internet, via a gateway. In the IEEE 802.11 system the device that offers the connection is typically called a portal PT. A portal PT is a logical entity which defines an integration point between an IEEE 802.11 specific network NW and another network ON. The WLAN network NW typically also comprises other servers, such as a DHCP server (Dynamic Host Configuration Protocol), which allocates IP addresses in the network NW.

In prior art WLAN solutions of the IEEE 802.11 the mobile node MN decides independently on handover on the basis of radio measurements. The WLAN network NW, however, has more information on the status of the network and different access points AP1–4.

The mobile IP functionality of the invention can also be implemented in the WLAN system shown in FIG. 4. The mobility agents (home agents HA and/or foreign agents FA) can be implemented in separate network elements which comprise the agent functionality or in the elements of the WLAN network NW, in which case the mobile agents can transmit information on the attributes of the network elements of the WLAN system to the mobile node MN. The access point AP1–4 may include a mobility agent or it can be bound with a mobility agent included in the network NW, in which case information on the attributes of the access point AP1–4 can be transmitted to the mobile node MN. The mobile node MN can employ this information on the network element attributes particularly when selecting the access point AP1–4.

Figures 5, 6:
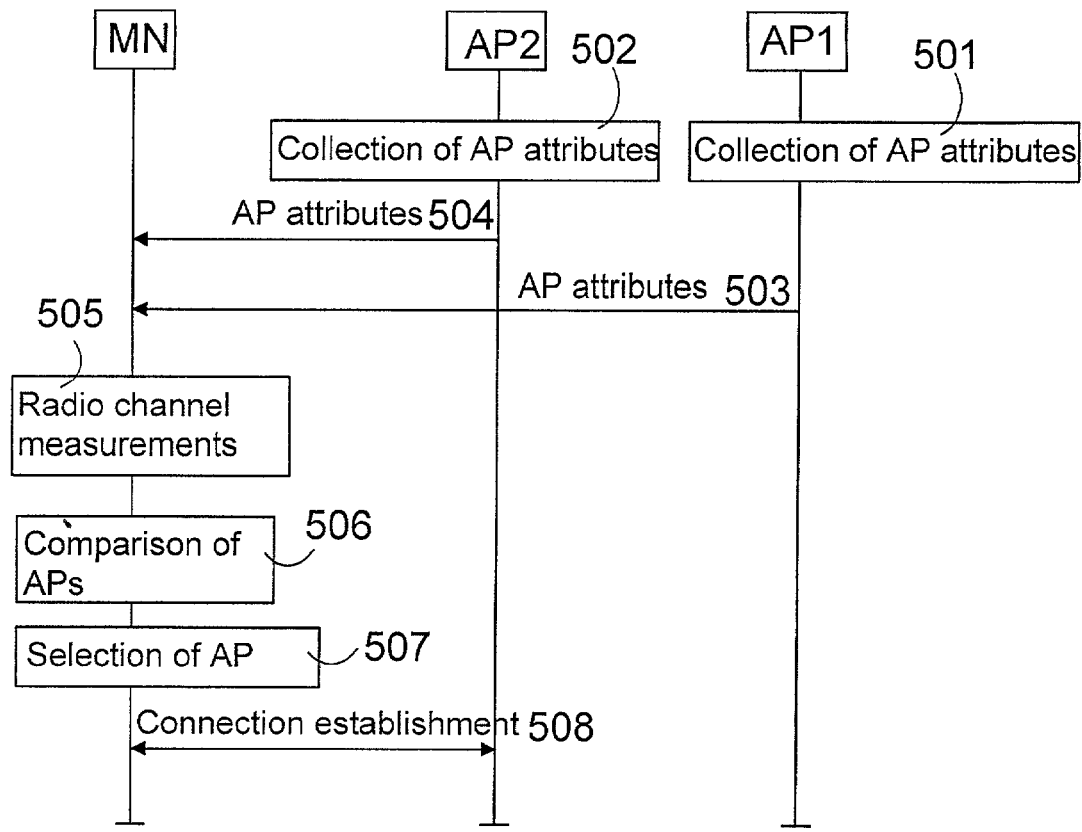
FIG. 5 illustrates selection of an access point according to a preferred embodiment.
FIG. 6 illustrates an advertising message transmitted by a mobility agent according to a preferred embodiment.

FIG. 5 illustrates a preferred embodiment of the invention in which information on the attributes of the access points AP1, AP2 is transmitted from the access points AP1, AP2 which are provided with the mobility agent functionality FA, HA to the mobile node MN. The access points AP1, AP2 collect 501, 502 (Collection of AP attributes) information on their attributes. The access point attributes to be collected and transmitted may include e.g. the following information:

loads of different access points (based e.g. on the number of users)

information on the least loaded access points information on the recommended access point other quality of service parameters of the access points (e.g. delay).

The information is transmitted 503, 504 (AP attributes) from the access points AP1, AP2 to the mobile node preferably in advertising messages of the mobility agents. Since the network is a WLAN network, the advertising messages are broadcast in the coverage area of the access point AP1, AP2. By means of the link layer connection the MN can receive attribute information from several access points AP1, AP2. The mobile node MN also performs 505 (Radio Channel Measurements) measurements on the radio channels of different access points AP1, AP2, such as signal level measurements.

The processing means PMMN of the MN may comprise a QoS management entity of the MAC layer which compares different access points. The QoS management entity may compare 506 (Comparison of APs) of the access point AP attributes received from the mobility agents of different access points AP1, AP2 and take the radio channel measurements 505 into account, too. The MN (QoS management entity) selects 507 (Selection of AP) as the serving access point the one that on the basis of the radio channel measurements and the information provided by the agents can best offer a data transmission connection to the mobile node MN. The QoS management entity can be arranged to emphasize various attributes differently, depending on the connection needed (according to the application used). The MN can, for example, disregard access points whose signal levels are below a predetermined limit and choose the least loaded access point from among the remaining points.

After the MN has selected access point AP2, for example, it can establish 508 (Connection Establishment) a connection to the AP2, in which case handover can be performed in a manner known per se. If access point AP2 already offers a data transmission connection to the MN, the connection is retained. If the mobility agent HA, FA is a separate network element, several access points AP1–4 may be attached to it, in which case the mobility agent may, unlike in FIG. 4, collect attribute information on several access points and transmit it in one message. The MN cannot use the attribute information until after a certain period from the reception, e.g. when the signal of the serving access point is sufficiently poor. If the access point is changed, the MN may also have to select a new foreign agent.

This solution clearly improves the capacity of wireless IP networks. In addition to radio channel measurements, the mobile node has important network information available for the selection of the access point. In particular, if the attribute information is transmitted in advertising messages of the mobile IP, the use of radio interface resources will hardly increase at all.

As stated above, according to a preferred embodiment, information on the network element attributes is transmitted in advertising messages of the mobility agents. The mobility agents HA, FA typically advertise their existence by sending advertising messages periodically to the sub-networks connected to them. The advertising messages are router advertisements of the ICMP protocol (Internet Control Message Protocol) to which a mobility agent specific extension (Mobility Agent Advertisement Extension) has been added. The foreign agents FA transmit one or more (8 at most) care of addresses in the advertising messages. The home agents HA do not need to offer care-of addresses but they must transmit advertising messages so that the MN notices when it has returned its home network HN. Thus the advertising messages transmitted by the home agents HA do not include care-of addresses. The IP address of the advertising messages transmitted by the mobility agents HA, FA is typically a multicast address 'all systems on this link' (224.0.0.1) or a 'limited broadcast' address (255.255.255.255).

The mobile node MN can also transmit an ICMP router solicitation on its sub-network to obtain advertising messages from the foreign agents FA. On the basis of the advertising messages transmitted by the agents the mobile node MN finds out whether it is in the home network HN or in a visited network VN. When the mobile node MN notices that it is in its home network HN, it functions according to the prior art without mobile IP functionalities. If the mobile node MN moves to its home network HN when it is registered with another network VN, the MN can delete its registration with the home agent HA. According to a preferred embodiment of the invention, the MN can also in this case receive advertising messages and utilize the attribute information on network elements included in them.

FIG. 6 illustrates the mobility agent specific extension of an advertising message according to an embodiment which comprises attribute information on network elements (e.g. attributes of the mobility agents and/or other network elements). The extension shown in FIG. 6 is preceded by a router advertising element according to the prior art ICMP protocol, which does not need to be described in greater detail here. The message type indicates the type of the ICMP router advertising extension. The type of the mobility agent specific extension is 3. There may be other router advertising extensions before or after the advertising message shown in FIG. 6. The length field indicates the length of the agent-specific extension, which depends on the number of the care-of addresses and on the amount of system information. A sequence number indicates the number of the extension. The mobility agent typically increases the sequence number after each successful advertisement. The MN may also utilize the sequence number if the mobility agent crashes. The registration lifetime defines the maximum lifetime that the mobility agent is prepared to accept in the registration request. The flags (R, B, H, F, M, G and V) describe certain attributes of the agent: the setting of flag R defines that registration is required through this agent. The setting of flag B defines that the foreign agent is busy, H: the agent is a home agent, F: the agent is a foreign agent. M, G and V describe what kind of encapsulation can be used (M=minimal encapsulation, G=GRE encapsulation, V=van Jacobsen header compression). The setting of flag T defines that the foreign agent supports reverse tunnelling. The 'reserved' field (Re) is reserved for later use.

The reserved field is followed by a field for the care-of addresses, the number of which may be zero or more. This is followed by a field reserved for the above-mentioned attribute information on the network elements of the system. The length of the field may vary depending on the amount of information. If desired, the attribute information of the foreign agents FA may be separated from the attributes of the other network elements and provided in a separate field.

According to a preferred embodiment, the mobile node MN can also receive and process advertising messages including the network element attributes when it is already registered with the home agent HA included in the care-of address of a foreign agent FA. This is particularly useful when information other than that on mobility agents is transmitted from the mobility agents FA, HA.

The functionality described above is applicable as such in systems according to the IPv4 protocol (IP version 4). Transmission of information on the network element attributes can also be applied in devices supporting the IPv6 protocol, which allows utilization of the mobile IPv6. The same basic principle applies to the mobile IPv6, i.e. the home agent HA transmits packets to the current care-of address of the mobile node MN. Entities similar to foreign agents FA are not needed in the mobile IPv6, but the mobile nodes MN obtain their care-of addresses themselves e.g. by means of address autoconfiguration. As regards a more detailed description of the prior art mobile IPv6, reference is made to the Internet draft issued by the IETF on 27 Apr. 2000 Mobility Support in IPv6. It should be noted that the standardisation of the mobile IPv6 is still incomplete.

According to a preferred embodiment of the invention, home agents (HA) or routers which support the IPv6 protocol can also transmit information on the attributes of different network elements which an MN supporting the IPv6 protocol can utilize. An IPv6 router may transmit router advertising messages which include attribute information on different network elements. The router may also be provided with the same inventive functionality as the mobility agents (FA, HA) described above. As illustrated in FIG. 2a, the router R may comprise means (PMA, CMA, MEA) for collecting information on the attributes of one or more network elements (router R or access point AP) of a telecommunications system and means (CMA) for transmitting the information in advertising messages to at least one mobile node MN. The mobile node MN may correspondingly (FIG. 2b) comprise receiving means (CMMN) for receiving attribute information on one or more network elements from one or more routers R, and processing means (PMMN) for selecting the router R or the access point on the basis of the above-mentioned information.

The attribute information transmitted by the routers R can thus be utilized in the selection of the router or the access point AP to be used in the mobile node (FIGS. 4 and 5). This means that the router to be used can be selected optimally. If the system supports the mobile IPv6, it is possible to provide mobility binding via the selected router R by means of the home agent HA. The router R can also collect and transmit the information on the access point attributes shown in FIG. 5 to the mobile node. Information on the router attributes may be similar to the information on the attributes of the foreign agents FA, i.e. static and current dynamic attributes of the router (e.g. transmission capacity, load). The advertising messages that are sent by the router R and comprise attribute information may be ICMP router advertisements to which the attribute information has been added. The advertising messages can also be used in a corresponding manner for transmitting attribute information in routers that support the IPv4 protocol.

It is obvious to a person skilled in the art that as technology advances, the inventive concept can be implemented in various ways. The invention and its embodiments are thus not limited to the examples described above, but may vary within the scope of the claims.

What is claimed is:

1. A method of using mobility agents in a telecommunications system, which telecommunications system comprises at least one mobile node supporting mobile IP and several network elements, of which network elements at least one comprises one or more mobility agents configured to transmit advertising messages to mobile nodes, the method comprising:
   establishing a data transmission connection between a mobility agent and one or more network elements in the system to collect attribute information,
   transmitting to the mobility agent information on attributes of one or more network elements from the connected one or more network elements,
   transmitting said information on the attributes in advertising messages from the mobility agent to at least one mobile node, and
   using said information in the mobile node in the selection of a serving network element.

2. A method according to claim 1, wherein:
   said information is transmitted in advertising messages including care-of addresses of the mobility agents periodically, at a request of a mobile node, or periodically and at the request of a mobile node.

3. A method according to claim 1, wherein the mobile node is wireless and the telecommunications system is wireless and comprises access points which offer a wireless connection to at least one mobile node, said information comprising at least one of the following:
loads of different access points,
information on a least loaded access point,
information on a recommended access point, and
other quality of service parameters of the access points.

4. A method according to claim 3, wherein:
attributes of access points that offer a wireless connection to the at least one mobile node are compared in the mobile node on the basis of said information,
an access point that, on the basis of its attributes and any other criteria, can offer a telecommunications connection to the mobile node is selected, and
a connection is established between the selected access point and the mobile node.

5. A method according to claim 4, wherein said other criteria comprises radio channel measurements.

6. A method according to claim 1, wherein;
attributes of different foreign agents are compared in the mobile node on the basis of attribute information received by the mobile node from the foreign agents,
a foreign agent is selected, that on the basis of its attributes, can take care of data transmission of the mobile node, and
a registration request is transmitted to the selected foreign agent.

7. A method of utilizing advertising messages in a telecommunications system, which telecommunications system comprises at least one mobile node and at least one router, the router being configured to transmit advertising messages to mobile nodes, the method comprising;
establishing a connection between at least one router and at least one network element to collect attribute information,
transmitting to the router information on attributes of one or more network elements from the connected network element,
transmitting advertising messages from the router to at least one mobile node, the messages including said information on the attributes of one or more network elements, and
using said information in the mobile node in selection of a serving network element.

8. A method according to claim 7, wherein the at least one mobile node is wireless and the telecommunications system is wireless and comprises access points which offer a wireless connection to the at least one mobile node, said information on attributes of one or more network elements comprising at least one of the following:
loads of different access points,
information on a least loaded access point,
information on a recommended access point, and
other quality of service parameters of the access points.

9. A method according to claim 8, wherein
attributes of different access points which offer a wireless connection to the at least one mobile node are compared in the mobile node on the basis of said information,
an access point that, on the basis of its attributes and any other criteria, can offer a telecommunications connection to the mobile node, is selected, and
a connection between the selected access point and the mobile node is established.

10. A method according to claim 9, wherein said other criteria comprise radio channel measurements.

11. A network element of a telecommunications system, the network element comprising:
an IP mobility agent, wherein the network element is configured to connect an other network element to collect attribute information,
the IP mobility agent is configured to receive information on attributes of one or more network elements from the other network element separate from the network element comprising the IP mobility agent, and
the IP mobility agent is configured to transmit the information on attributes of one or more other network elements in advertising messages to at least one mobile node.

12. A network element according to claim 11, wherein the information on attributes of one or more network elements transmitted in advertising messages further comprises attributes of one or more access points of the telecommunications system.

13. A network element according to claim 11, wherein the IP mobility agent is configured to request attribute information from the other network element.

14. A mobile node supporting the mobile IP for a telecommunications system, which telecommunications system comprises several network elements, of which at least one comprises one or more mobility agents, said mobile node comprising:
reception means for receiving in advertising messages attribute information on one or more network elements from at least one mobility agent, said information being received by the one or more mobility agents from another network element separate from the network element comprising the one or more mobility agents and connected to collect the attribute information received in advertising messages, and
processing means for selecting a serving network element on the basis of said attribute information received in advertising messages.

15. A mobile node according to claim 14, wherein:
the processing means are configured to compare attributes of the foreign agents of the basis of said attribute information received in advertising messages,
the processing means are configured to select a foreign agent that on the basis of its attributes can take care of data transmission of the mobile node, and
the processing means are configured to transmit a registration request to the selected foreign agent.

16. A mobile node according to claim 14, wherein:
said attribute information in advertising messages comprise attributes of access points of the telecommunications system,
the processing means are configured to compare the attributes of the access points on the basis of said attribute information received from the mobility agents,
the processing means are configured to select an access point that, on the basis of its attributes and any other criteria, can offer a telecommunication connection to the mobile node, and
the processing means are configured to establish a connection between the selected access point and the mobile node.

17. A mobile node according to claim 16, wherein said other criteria comprise radio channel measurements.

18. A mobile node according to claim 14, wherein
said attribute information comprises at least one of the following foreign agent attributes:

current delay of a connection offered by the foreign agent,
average delay of the connection offered by the foreign agent,
jitter of the connection offered by the foreign agent,
number of users served by the foreign agent, and
throughput of the foreign agent.

19. A method according to claim 18, wherein
said attribute information comprises at least one of the following foreign agent attributes:
current delay of a connection offered by the foreign agent,
average delay of the connection offered by the foreign agent,
jitter of the connection offered by the foreign agent,
number of users served by the foreign agent,
throughput of the foreign agent,
load of the foreign agent, and
proportional load of the foreign agent compared to other foreign agents in the system.

20. A mobile node for a telecommunications system, which telecommunications system comprises one or more routers configured to transmit advertising messages having attribute information, said mobile node comprising:
reception means for receiving attribute information on one or more network elements from at least one router, said attribute information being received by the at least one router from another network element separate from the network element comprising the at least one router and connected to collect the attribute information, and
processing means for selecting a serving network element on the basis of said attribute information.

21. A mobile node according to claim 20, wherein said attribute information in advertising messages comprises attributes of access points of the telecommunications system,
the processing means are configured to compare the attributes of the access points on the basis of said attribute information,
the processing means are configured to select an access point that, on the basis of its attributes and any other criteria, can offer a telecommunication connection to the mobile node, and
the processing means are configured to establish a connection between the selected access point and the mobile node.

22. A mobile node according to claim 21, wherein said other criteria comprises radio channel measurements.

* * * * *